(12) United States Patent
Miura et al.

(10) Patent No.: US 7,636,298 B2
(45) Date of Patent: Dec. 22, 2009

(54) APPARATUS AND METHOD FOR PACKET ERROR CORRECTION

(75) Inventors: Tsuyoshi Miura, Kawasaki (JP); Shin Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 662 days.

(21) Appl. No.: 10/853,000

(22) Filed: May 25, 2004

(65) Prior Publication Data

US 2005/0111371 A1 May 26, 2005

(30) Foreign Application Priority Data

Nov. 20, 2003 (JP) .............................. 2003-390914

(51) Int. Cl.
| | |
|---|---|
| G01R 31/08 | (2006.01) |
| G06F 11/00 | (2006.01) |
| H04L 1/00 | (2006.01) |
| H04L 1/18 | (2006.01) |
| H03M 13/00 | (2006.01) |

(52) U.S. Cl. .................. 370/216; 370/248; 370/394; 370/253; 714/751; 714/752; 714/758

(58) Field of Classification Search .............. 370/394, 370/252, 253, 428; 714/748, 708, 751
See application file for complete search history.

(56) References Cited

U.S. PATENT DOCUMENTS

| 7,017,102 B1 * | 3/2006 | Kristensson et al. ........ 714/786 |
| 7,376,880 B2 * | 5/2008 | Ichiki et al. .................. 714/751 |
| 2002/0114283 A1 * | 8/2002 | Lee ............................. 370/252 |
| 2003/0126238 A1 * | 7/2003 | Kohno et al. ................ 709/220 |
| 2004/0042494 A1 * | 3/2004 | Chen et al. .................. 370/474 |
| 2005/0013249 A1 * | 1/2005 | Kong et al. .................. 370/235 |
| 2005/0249211 A1 * | 11/2005 | Chou et al. .................. 370/389 |
| 2006/0005101 A1 * | 1/2006 | Li et al. ....................... 714/758 |
| 2006/0048036 A1 * | 3/2006 | Miura et al. ................. 714/758 |
| 2009/0063928 A1 * | 3/2009 | Gondo et al. ................ 714/752 |

FOREIGN PATENT DOCUMENTS

| EP | 0 703 685 | 3/1996 |
| JP | 7-67175 | 6/1996 |
| JP | 9-214474 | 8/1997 |
| JP | 11-136220 | 5/1999 |
| JP | 2002-9883 | 1/2002 |
| JP | 2003-174478 | 6/2003 |
| KR | 2003-0051265 | 6/2003 |

OTHER PUBLICATIONS

Korean Written Submission Notification mailed Mar. 24, 2006, with translation.

(Continued)

*Primary Examiner*—Chau T Nguyen
*Assistant Examiner*—Farah Faroul
(74) *Attorney, Agent, or Firm*—Katten Muchin Rosenman LLP

(57) ABSTRACT

A packet error correcting apparatus includes a retransmission request controlling unit controlling a timing of transmission of a retransmission request to a packet transmitting apparatus from a retransmission request transmitting unit according to whether an error correcting unit can restore the lost packet within a predetermined time period when loss of the packet is detected. In a packet receiving apparatus supporting both Forward Error Correction (FEC) and Automatic Repeat reQuest (ARQ), it is possible to control a timing of transmission of a retransmission request when packet loss occurs, thereby to regenerate video and/or voice with the most suitable delay time while suppressing transmission of unnecessary retransmission requests.

12 Claims, 8 Drawing Sheets

OTHER PUBLICATIONS

H. Schulzrinne et al. A Transport Protocol for Real-Time Applications. IETF RFC 1889, pp. 1-75.
J. Rosenberg et al. An RTP Payload Format for Generic Forward Error Correction. IETF RFC2733 pp. 1-26.
Notice of Reason(s) for Rejection mailed Jun. 3, 2008, from the corresponding Japanese Application.
Notice of Reason(s) for Rejection dated Feb. 24, 2009, for corresponding Japanese Application 2003-390914.

* cited by examiner

APPARATUS AND METHOD FOR PACKET ERROR CORRECTION

BACKGROUND OF THE INVENTION (1) Field of the Invention

The present invention relates to an apparatus and a method for correcting packet error, that is, a technique improving error resistance when packet data (hereinafter referred to simply as "packets") transmitted from an encoder (packet transmitting apparatus) is received by a decoder in network environments where there occur a lot of packet losses (errors) such as the Internet or the like, for example. Particularly, the present invention relates to a technique suitable for use to improve the error resistance in streaming data transfer.

(2) Description of Related Art

Recently, there is an increasing demand for data communications of image data, voice data and the like via various communication means including Internet communications. Particularly, services by means of streaming delivery system in data transfer over the Internet are increasing as services of recent data communications. In the streaming delivery system, received data is regenerated in real time while the data is transferred from an MPEG (Motion Picture Experts Group) encoder to an MPEG decoder. As a system employing such system, there are streaming delivery of VOD (Video On Demand) or live image, video conference system and the like, for example.

As an Internet technique suitable for such real time communications, there is RTP (Real-time Transport Protocol) [refer to non-patent document 1 (IETF RFC 1889) below]. In data communications using RTP, a time stamp is added to a packet as time information, the relationship of time is grasped between an encoder which transmits the packet and a decoder which receives the packet by referring to the time stamp, so that the decoder can perform regeneration in synchronization, without affected by delay, fluctuation (jitter) and the like during the packet transfer. However, since RTP does not assure real-time data communication, there is possibility that the RTP packet may suffer delivery delay and packet loss in the network like other packets.

Even under such circumstances, the decoder can regenerate data by using only packets having arrived within an expected time. Even when somewhat data loss (packet loss) occurs in video or voice data, it is possible to regenerate the data by degrading its data quality, or by means of a data correction process. Packets delivered too late for the generation, or and erroneous packets are discarded by the decoder. Accordingly, there is a disadvantage that when a packet loss or an error occurs, the decoder's side cannot maintain the quality in regeneration even if a high-quality data delivery process is performed.

As a proposal for solving such problem in data transfer using RTP, TCP (Transmission Control Protocol) which is a data transfer protocol having high reliability in data transfer is used to transmit a packet retransmission request and a retransmission packet. However, TCP is reliable in error correction, but causes low throughput and large delay, so that the retransmission packet may be too late for the regeneration. Accordingly, this becomes a problem when a real-time communication system is realized.

As another technique for error correction coping with packet losses, there is FEC (Forward Error Correction: refer to non-patent document 2 (IETF RFC 2733) below). FIG. 7 shows an error correcting method according to FEC. As shown in FIG. 7, according to FEC, an encoder 100 transmits a redundant packet (parity) P1 generated on the basis of exclusive-OR (XOR) operation together with transmission data (packets) D1 and D2, whereby a decoder 200 can restore a lost packet D1 or D2 from the redundant packet P1 even when a packet loss occurs in a network 300 such as the Internet or the like on the route. Thus, FEC is a technique which does not require packet retransmission of the packet from the encoder 100.

Using such FEC can realize media transmission of high reliability and interactivity even in a network environment such as the Internet in which there occur a lot of packet losses, thereby providing a service of Internet live broadcasting or the like. However, it cannot realize high-quality media transmission in a network environment in which a packet loss occurs in burst.

As an error correction method coping with such burst packet losses, there is ARQ (Automatic Repeat Request), for example. FIG. 8 shows error correction method according to ARQ. As shown in FIG. 8, ARQ is a technique that when a decoder 500 detects a packet loss, the decoder 500 immediately transmits a retransmission request for the lost packet to an encoder 400 (refer to an arrow 600), and the encoder 400 retransmits the lost packet (refer to an arrow 700).

In known systems, it is general to fixedly use either one of the error correction methods, FEC or ARQ. Use of FEC technique is effective in a network environment where the transmission rate is low but the error rate is high, but it causes a large overhead of an FEC packet when the transmission rate is high and the error rate is low, which degrades the transmission efficiency. Use of ARQ technique is effective in a network environment where the transmission rate is high but the error rate is low. When the transmission rate is low but the error rate is high, ARQ degrades the transmission efficiency because there are required a lot of exchanges of information in relation with retransmission requests.

For the above reasons, there are proposed techniques which are combination of the technique of ARQ and the technique of FEC, as disclosed in patent document 1 [Japanese Patent Laid-Open (Kokai) Publication No. 2002-9883] and patent document 2 [Japanese Patent Laid-Open(Kokai) Publication No. HEI 7-67175], for example.

The technique disclosed in the patent document 1 uses a specific index value (error rate or transmission rate) for errors occurring due to transmission errors of communication data occurring in the communication network system, and automatically switches the error correcting method. More practically, received data is decrypted, the index value (error rate/transmission rate) is calculated. When the index value is not larger than a threshold value, the error correction method is automatically switched to ARQ. When the index value is larger than the threshold value, the error correction method is automatically switched to FEC. Whereby, it becomes possible to automatically select the most efficient error correction method according to the condition of the data transmission rate or the transmission efficiency so that the network traffic load can be decreased (refer to paragraphs 0021 to 0023 of the patent document 1).

The technique disclosed in the patent document 2 changes the transmission rate according to the channel condition in a radio section, which is not always stable, uses either FEC or ARQ, or the both as the correction control system, thereby providing a data transmission system having the best transmission system. In this technique, the channel condition (condition of error occurrence) in a radio section is monitored, the transmission rate is changed according to the error occurrence condition, and either ARQ or FEC is selected and determined as the error control system to be applied.

More practically, when the transmission rate is 9600 bps, for example, ARQ is used. When the transmission rate (4800 bps or 2400 bps) is other than 9600 bps, it is determined whether or not correction using FEC is possible. When possible, self correction is performed. When impossible, a retransmission request is issued if the transmission rate is 4800 bps. Further, the number of times of retransmission is monitored. When the number of times of retransmission is large and the line quality is poor, the transmission rate is decreased to 4800 bps, and the mode is changed to simultaneous use of both ARQ and FEC. When the number of times of retransmission is increased and the line quality is further degraded at the transmission rate 4800 bps, the transmission rate is further decreased to 2400 bps, and the mode is changed to FEC (refer to paragraphs 0014 to 0015 of the patent document 2).

The technique disclosed in the patent document 2 selects a data transmission rate and an error control system suited to the data transmission rate according to the line condition, thereby to attain the most efficient transmission rate.

[Patent Document 1] Japanese Patent Laid-Open (Kokai) Publication No. 2002-9883

[Patent Document 2] Japanese Patent Laid-Open (Kokai) Publication No. HEI 7-67175

[Non-patent Document 1] H. Schulzrinne et al., "RTP: A Transport Protocol for Real-Time Applications," Request for Comments: 1889, [online], January, 1996, IETF Network Working Group, [searched on Nov. 20, 2003], Internet <ietf.org/rfc/rfc1889.txt>.

[Non-patent Document 2] J. Rosenberg et al., "An RTP Payload Format for Generic Forward Error Correction," Request for Comments:2733, [on line], December 1999, IETF Network Working Group, [searched on Nov. 20, 2003], Internet <ietf.org/rfc/rfc2733.txt>.

In the above known systems, particularly in the techniques disclosed in the patent documents 1 and 2, it is main that either FEC or ARQ is selectively used according to the channel condition such as the transmission rate or the like although the techniques support both FEC and ARQ, it is thus impossible to apply an error correction method in consideration of a communication required to be real-time. For this, in a communication required to be real-time such as streaming data transfer or the like, it is difficult to regenerate video or voice with the most suitable delay time. In the patent document 1, there is description of "a mode simultaneously using both FEC and ARQ", but there is no concrete description about what timing the retransmission request is issued in the mode simultaneously using both FEC and ARQ, which causes the danger of an increase in network load due to unnecessary retransmission requests.

SUMMARY OF THE INVENTION

In the light of the above problems, an object of the present invention is to provide a packet error correcting apparatus and method, which can regenerate video and voice with the most suitable delay time by that a packet receiver such as a decoder or the like supporting both FEC and ARQ controls a timing of transmission of a retransmission request at the time of occurrence of packet loss while suppressing transmission of unnecessary retransmission requests.

To achieve the above object, the present invention provides a packet error correcting apparatus comprising:

(1) a packet receiving unit for receiving a plurality of packets and one redundant packet for error correction over a network from a packet transmitting apparatus transmitting the packets;

(2) a packet loss detecting unit for detecting loss of a packet received by the packet receiving unit;

(3) an error correcting unit for performing an error correcting process to restore the lost packet on the basis of the redundant packet received by the packet receiving unit when the packet loss detecting unit detects loss of the packet;

(4) a retransmission request transmitting unit being able to transmit a retransmission request for the lost packet to the packet transmitting apparatus; and (5) a retransmission request controlling unit for controlling a timing of transmission of the retransmission request to the packet transmitting apparatus from the retransmission request transmitting unit according to whether or not the lost packet can be restored by the error correcting unit within a predetermined time period when the packet loss detecting unit detects loss of the packet.

The retransmission request controlling unit may comprise a redundant packet arrival time calculating unit for calculating time required until the next redundant packet is received by the packet receiving unit when the packet loss detecting unit detects loss of the packet, a redundant packet arrival time determining unit for determining whether or not a result of calculation by the redundant packet arrival time calculating unit is larger than a predetermined threshold value, and an arrival time retransmission request transmission instructing unit for giving an instruction for transmitting the retransmission request to the retransmission request transmitting unit when the redundant packet arrival time determining unit determines that the result of calculation is larger than the threshold value.

Alternatively, the retransmission request controlling unit may comprise a lost packet number determining unit for determining whether or not the number of lost packets detected by the packet loss detecting unit is equal to or larger than a predetermined number, and a lost packet number retransmission request transmission instructing unit for giving an instruction for transmitting the retransmission request to the retransmission request transmitting unit when the lost packet number determining unit determines that the number of lost packets is equal to or larger than the predetermined number.

Still alternatively, the retransmission request controlling unit may comprise an error correction determining unit for determining whether or not restoration of the lost packet succeeds in the error correcting process by the error correcting unit, a retransmission request transmission confirming unit for confirming whether or not the retransmission request has been already transmitted to the packet transmitting apparatus when the error correction determining unit determines that the restoration of the lost packet fails, and an error correction result retransmission request transmission instructing unit for giving an instruction for transmitting the retransmission request to the retransmission request transmitting unit when the retransmission request transmission confirming unit confirms that the retransmission request is not yet transmitted.

The present invention further provides a packet error correcting method comprising the steps of receiving a plurality of packets and one redundant packet for error correction over a network from a packet transmitting apparatus transmitting the packets, detecting loss of a reception packet, and when loss of the packet is detected, controlling a timing of transmission of a retransmission request with respect to the lost packet to the packet transmitting apparatus according to whether or not the lost packet can be restored within a predetermined time period in an error correcting process for restoring the lost packet on the basis of the redundant packet to be received next.

When loss of the packet is detected, time required until the next redundant packet is received may be calculated, it may be determined whether or not a result of the calculation is larger than a predetermined threshold value, and the retransmission request may be transmitted when it is determined that the result of the calculation is larger than the threshold value.

Alternatively, it may be determined whether or not the number of lost packets is equal to or larger than a predetermined number, and the retransmission request may be transmitted when the number of lost packets is equal to or larger than the predetermined number.

Still alternatively, it may be determined whether or not restoration of the lost packet succeeds in the error correcting process, it may be determined whether or not the retransmission request has been already transmitted to the packet transmitting apparatus when it is determined that the restoration of the lost packet fails, and the retransmission request is transmitted when the retransmission request is not yet transmitted.

According to this invention, it becomes possible to regenerate data of video, voice and the like with the most suitable delay time while suppressing the load on the network by suppressing transmission of an unnecessary retransmission request and a retransmitted packet responsive thereto in streaming data delivery or the like required to be real time.

DESCRIPTION OF THE PREFERRED EMBODIMENTS

[A] Description of First Embodiment

Figure 1:
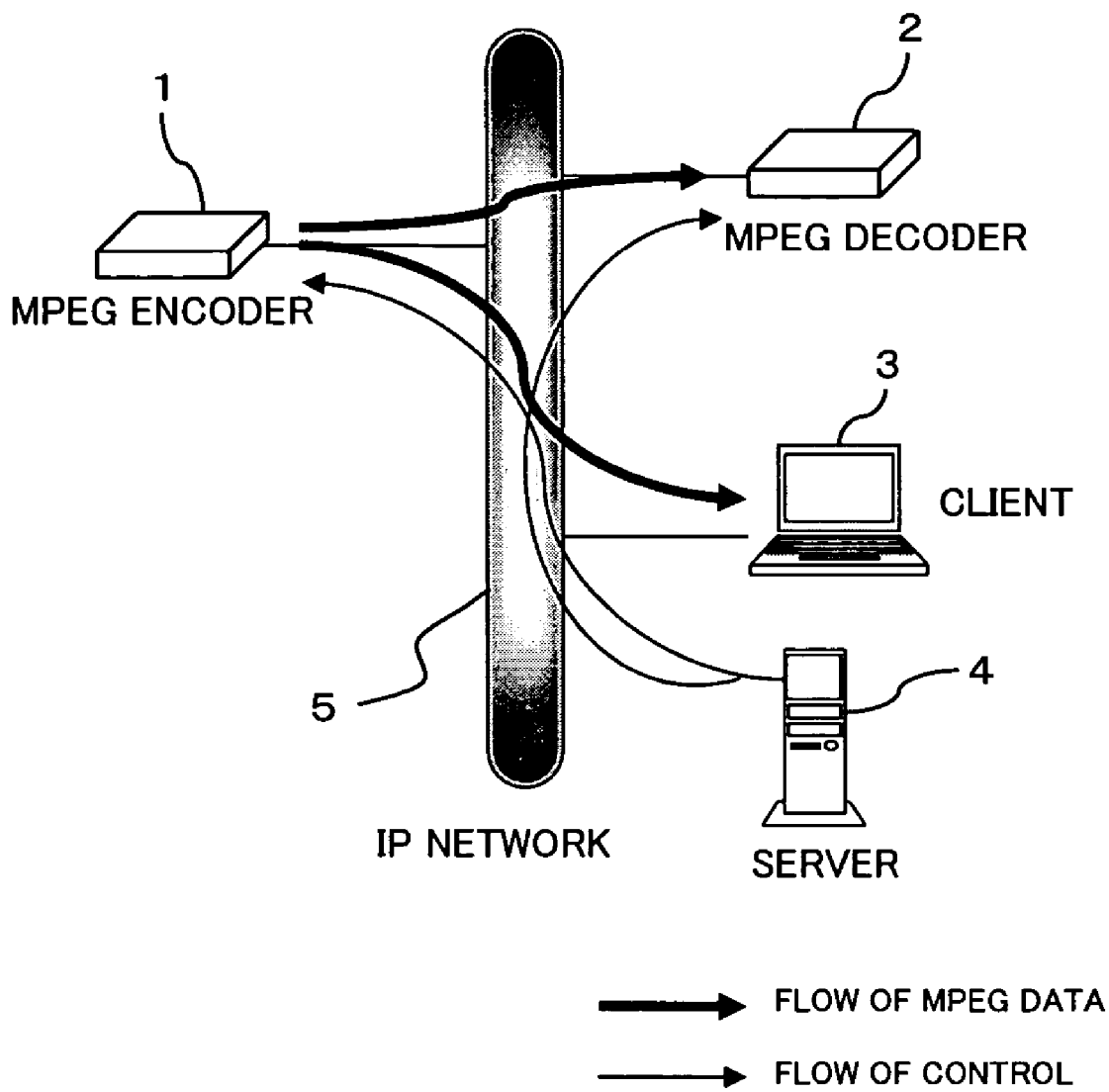
FIG. 1 is a block diagram showing a structure of a communication system to which an error correcting apparatus according to a first embodiment of this invention is applied.

FIG. 1 is a block diagram showing a structure of a communication system to which an error correcting apparatus according to a first embodiment of this invention is applied. As shown in FIG. 1, the communication system of this embodiment is configured by connecting, to one another, an MPEG encoder 1 delivering live MPEG streaming data encapsulated in packets over an IP (Internet Protocol) network having high error rate as being a network 5, an MPEG decoder and/or a client terminal 3 receiving, decoding, displaying, and so forth the streaming data (packets) transmitted from the MPEG encoder 1, and a server 4 performing setting of and control on the encoding mode, a live delivery address, etc. of the MPEG encoder 1, the MPEG decoder 2 and the like.

In this system, the server 4 sets the encoding mode (MPEG 1, 2 or 4, the encoding bit rate, with or without voice, etc.) and a live-delivery address to the MPEG encoder 1. The server 4 also sets, to the MPEG decoder 2 or the client terminal 3 (hereinafter referred to simply as "client 3"), a live reception address, a threshold value (to be described later) used to determine whether to immediately transmit a retransmission request, etc.

The MPEG encoder 1 is installed in, for example, a remote place such as a place to be monitored by a monitoring system or the like, encodes inputted video in a set encoding mode, and delivers encoded MPEG streaming data and redundant packets for error correction (FEC packets) to the set address. The MPEG decoder 2 and/or the client 3 decodes and regenerates the received MPEG streaming data while correcting errors, thereby to be able to monitor the video in a remote place.

Figure 2:
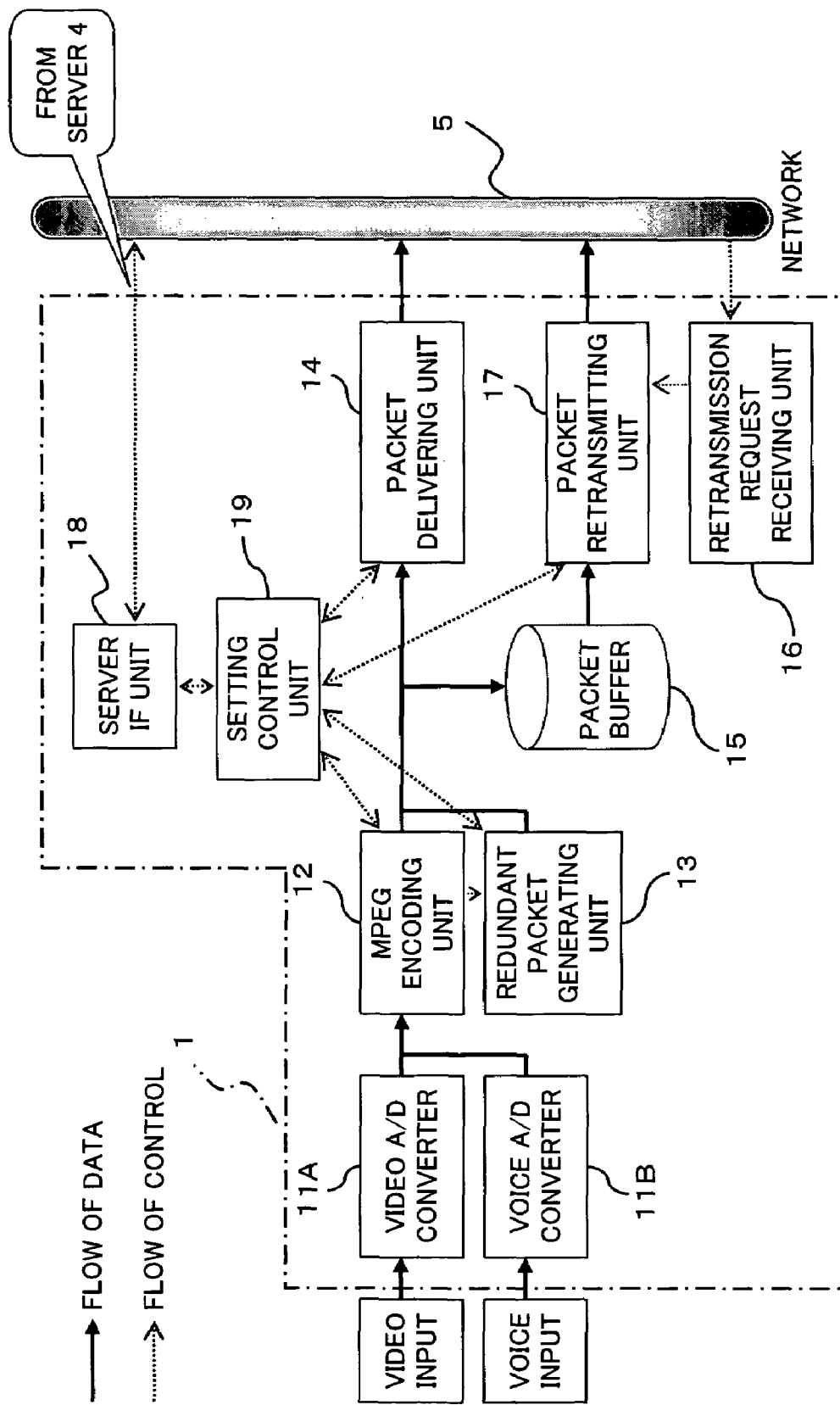
FIG. 2 is a block diagram showing a structure of an essential part of an MPEG encoder shown in FIG. 1.
Figure 3:
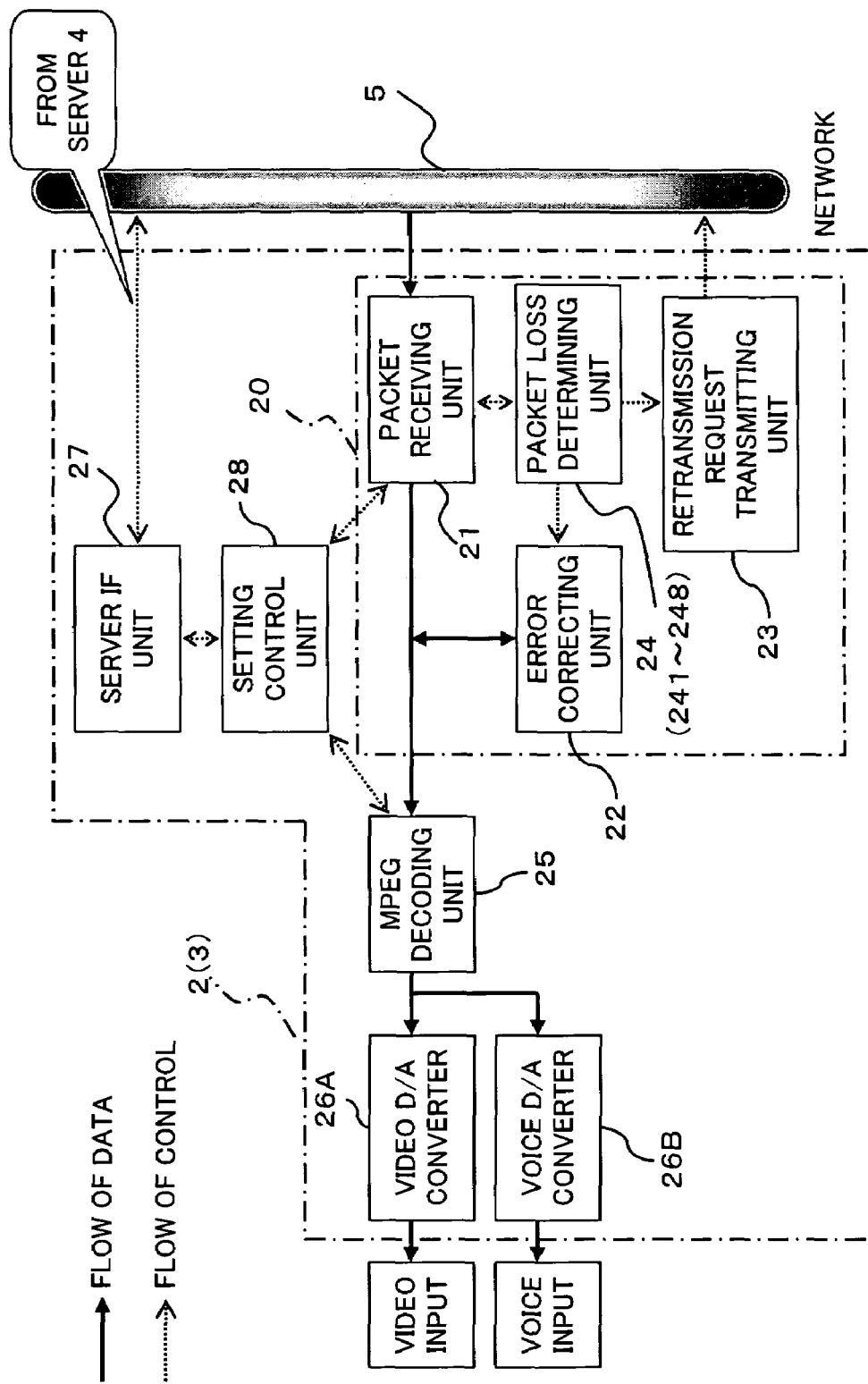
FIG. 3 is a block diagram showing a structure of an essential part of an MPEG decoder shown in FIG. 1.

For this purpose, the MPEG encoder 1 of this embodiment and the MPEG decoder 2 of this embodiment are structured as shown in, for example, FIGS. 2 and 3, respectively. The MPEG encoder 1 on the packet transmission side does not necessarily have a special structure when this invention is applied. Any apparatus can be applied in the similar manner as long as it has at least a function of retransmitting a requested packet in response to a retransmission request (that is, supporting ARQ).

(A1) Description of MPEG Encoder 1

As shown in FIG. 2, the MPEG encoder 1 comprises, when attention is given to its essential parts, a video analog/digital (A/D) converter 11A, a voice analog/digital (A/D) converter 11B, an MPEG encoding unit 12, a redundant packet generating unit 13, a packet delivering unit 14, a packet butter 15, a retransmission request receiving unit 16, a packet retransmitting unit 17, a server interface (IF) unit 18 and a setting control unit 19.

The video A/D converting unit 11A converts inputted video (analog signals) from a video camera or the like into digital signals. The voice A/D converting unit 11B converts inputted voice (analog signals) into digital signals. The MPEG encoding unit 12 encodes the digital video and voice signals from the video A/D converter 11A and the voice A/D converter 11B according to MPEG, which also has a function of encapsulating encoded MPEG streaming data into packets.

The redundant packet generating unit 13 generates redundant packets (parity) for error correction on the basis of the MPEG streaming data encoded by the MPEG encoding unit 12. The packet delivering unit 14 encapsulates the MPEG streaming data from the MPEG encoding unit 12 into packets, and transmits (delivers) the packets together with the packets from the redundant packet generating unit 13 over the network 5. The redundant packet is periodically transmitted at the rate of one per N (N being an integer not smaller than two) MPEG packets, for example.

The packet buffer 15 stores the MPEG packets (copied packets) that have been transmitted for a predetermined time period in preparation for retransmission of the packets in response to retransmission requests. The retransmission request receiving unit 16 receives a retransmission request from the MPEG decoder 2 over the network 5. When the transmission request receiving unit 16 receives a retransmission request, the packet retransmitting unit 17 reads out an MPEG packet to be retransmitted from the packet buffer 15, and transmits the packet to the MPEG decoder 2 that has originated the retransmission request when the retransmission request receiving unit 16 receives the retransmission request.

The server IF unit 18 interfaces with the network 5, which can receive setting information, control information and the like from the server 4 over the network 5. The setting control unit 19 generally controls the whole operation of the MPEG encoder 1, which can perform setting to and controls on the MPEG encoding unit 12, the redundant packet generating unit 13, the packet delivering unit 14, and packet retransmitting unit 17 and the like according to the setting information and control information received from the server 4 by the server IF unit 18.

More practically, with respect to apparatus setting, the setting control unit 19 interprets setting information about an encoding mode, a live delivery address, a redundant packet generation rate (interval), a retransmission packet storing time, etc. received from the server 4 by the server IF unit 18, sets the encoding mode to the MPEG encoding unit 12, sets the live delivery address to the packet delivering unit 14, sets the redundant packet generation rate to the redundant packet generating unit 13, and sets the retransmission packet storing time to the packet buffer 15.

The MPEG encoder 1 converts inputted video and voice into digital signals by means of the A/D converters 11A and 11B, respectively, and encodes the digital signals in an encoding mode set from the server 4 by means of the MPEG encoding unit 12. The redundant packet generating unit 13 generates a redundant packet (parity) at a rate of one per a plurality of MPEG packets set from the server 4 on the basis of exclusive-OR operation, and delivers the redundant packet together with the MPEG packets over the network 5 from the packet delivering unit 14.

At this time, the MPEG encoder 1 stores the delivered MPEG packets in the packet buffer 15 in preparation for retransmission requests from the MPEG decoder 2. When the retransmission request receiving unit 16 receives a retransmission request from the MPEG decoder 2, the MPEG encoder 1 takes out a packet desired by the MPEG decoder 2 from the packet buffer 15, and delivers the packet over the network 5 from the packet retransmitting unit 17.

(A2) Description of MPEG Decoder 2

As shown in FIG. 3, the MPEG decoder 2 (or client 3: the same shall apply hereinafter) comprises, when attention is given to its essential parts, a packet receiving unit 21, an error correcting unit 22, a retransmission request transmitting unit 23 and a packet omission determining unit 24 as an error correcting apparatus 20, along with an MPEG decoding unit 25, a video digital/analog (D/A) converter 26A, a voice digital/analog (D/A) converter 26B, a server IF unit 27 and a setting control unit 28.

The packet receiving unit 21 receives packets transmitted from the MPEG encoder 1 over the network 5. The error correcting unit 22 performs an error correcting process (FEC) to restore a lost packet on the basis of a redundant packet next received by the packet receiving unit 21 when packet loss (packet omission) occurs. Occurrence of packet loss can be recognized by monitoring the packet number (sequence number) of RTP as will be described later, for example.

The retransmission request transmitting unit 23 transmits a retransmission request to the MPEG encoder 1 according to a retransmission request transmission instruction from the packet loss determining unit 24. The packet loss determining unit (packet loss detecting unit, retransmission request control unit) 24 detects loss of a packet (omission of a packet) received by the packet receiving unit 21, and when packet loss is detected, controls the timing of transmission of a retransmission request to the MPEG encoder 1 from the retransmission request transmitting unit 23 according to whether or not the lost packet can be restored within a predetermined time period by the error correcting unit 22.

Now, attention is given to that there is a case where a redundant packet can be received immediately after occurrence of packet loss and error correction is possible by FEC as will be described later. For this, the packet loss determining unit 24 determines whether or not to immediately transmit a retransmission request to the MPEG encoder 1 when packet omission occurs. Here, the packet loss determining unit 24 can determine time at which the next redundant packet arrives on the basis of, for example, an interval of transmission of a redundant packet, and control (change) the timing of transmission of the retransmission request from the retransmission request transmitting unit 23 according to a result of the determination.

The MPEG decoding unit 25 MPEG-decodes the received MPEG streaming data in an encoding mode corresponding to the decoding mode on the transmission side (MPEG encoder 1). The video D/A converter 26A converts the digital vide data MPEG-decoded by the MPEG decoding unit 25 into analog data, and outputs the data to a video display apparatus such as a monitor apparatus or the like. The voice D/A converter 26A converts digital voice data MPEG-decoded by the MPEG decoding unit 25 into analog data, and outputs the data to a voice outputting apparatus such as a speaker or the like.

The server IF unit 27 interfaces with the network 5. Additionally, the server IF unit 27 can receive the setting information and the control information from the server 4 like that of the MPEG encoder 1. The setting control unit 28 performs setting to and controls on the packet receiving unit 21, the MPEG decoding unit 25 and so forth according to the setting information and the control information received by the server IF unit 27.

With respect to the apparatus setting, a live reception address received from the server 4 by the server IF unit 27 is interpreted by the setting control unit 28, and the address is set in the packet receiving unit 21. Whether or not packet loss occurs in packets received by the packet receiving unit 21 is determined by the packet loss determining unit 24. When no packet loss occurs, the packets are MPEG-decoded by the MPEG decoding unit 25, and the video and voice are regenerated by the video and voice D/A converters 26A and 26B, respectively, and outputted.

When the packet loss determining unit 24 recognizes packet loss, MPEG-decoding by the MPEG decoding unit 25 is not immediately performed. But, the MPEG decoding unit 25 waits until the next redundant packet is received and the error correction (FEC) is performed by the error correcting unit 22, or until the lost packet is received in response to transmission of a retransmission request to the MPEG encoder 1 from the retransmission request transmitting unit 23. Thereafter, the MPEG decoding unit 25 performs the MPEG decoding.

Hereinafter, the operation will be described in more detail with reference to a flowchart (steps S1 to S13) shown in FIG. 4. Assuming here that the MPEG encoder 1 transmits one redundant packet for N MPEG packets, an RTP header is added to a transmission packet and the packet is transmitted according to UDP (User Datagram Protocol). When a retransmission request is received from the MPEG decoder 2, a requested packet is transmitted.

Figure 4:
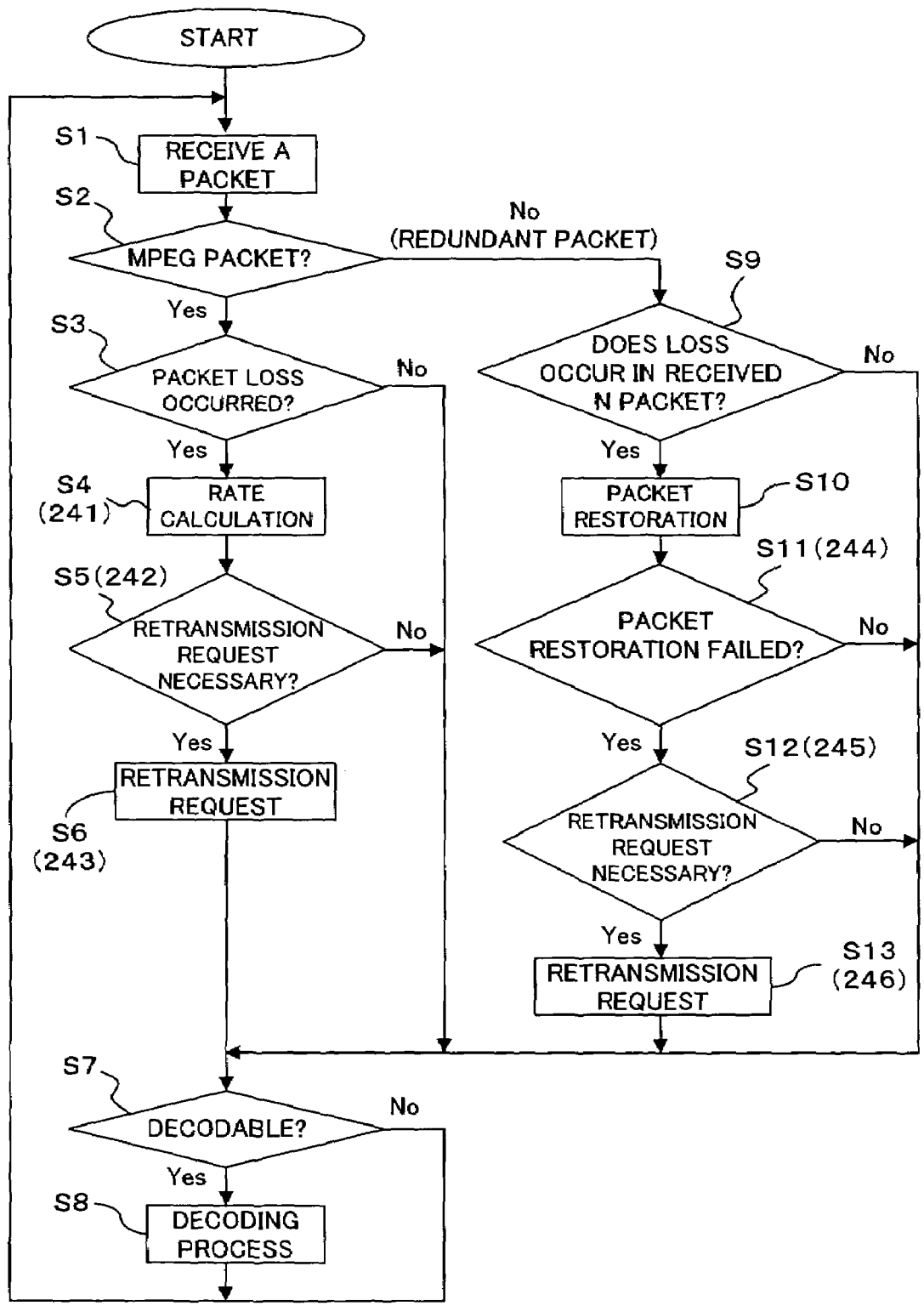
FIG. 4 is a flowchart for illustrating an operation of the MPEG decoder shown in FIG. 3.

As shown in FIG. 4, the MPEG decoder 2 receives a packet delivered over the network 5 by the packet receiving unit 21 (step S1). The MPEG decoder 2 then determines whether the received packet is an MPEG packet or a redundant packet (step S2). When the received packet is an MPEG packet (when Yes at step S2), the MPEG decoder 2 determines whether or not the received packet is the next packet to a packet received last time on the basis of the sequence number (packet number) of RTP, for example, to determine whether or not packet loss occurs (step S3). When it is found that no packet loss occurs as a result, the received packet (MPEG packet) is outputted as it is to the MPEG decoding unit 25 (NO route at step S3).

When packet loss occurs, the packet loss determining unit 24 determines whether or not to immediately transmit a retransmission request. Namely, there is possibility that even if the retransmission request for the lost packet is immediately transmitted, the lost packet can be error-corrected (restored) with a redundant packet received thereafter. Thus, a process relating to the retransmission request becomes wasteful when the lost packet can be restored. Further, since the unnecessary retransmission request (packet) is transmitted over the network 5, it increases the load on the network 5.

When the transmission rate of the MPEG encoder 1 is low, it will take a long time to receive the redundant packet (up to N packets) if the MPEG decoder 2 waits reception of the redundant packet. This results in an increase in delay time of video/voice regeneration corresponding to that period of time.

For example, when the system rate is 6 Mbps (megabit per second), the packet length is 1024 bytes and the redundant packet generation interval (rate) is one packet per 10 packets, (1024[bytes]*8[bits/byte]/6,000,000[bits/sec])*10=0.01365 [sec].

Accordingly, the redundant packet arrives after 13.65 msec (millisecond). When the system rate is 25 kpbs (kilobit per second), the packet length is 512 bytes and the redundant packet generation interval is one packet per 10 packets, (512[bytes]*8[bits/byte]/25,000[bits/sec])*10=1.63 84[sec].

Accordingly, the redundant packet does not arrive until 1.64 sec (second) has elapsed.

When recognizing occurrence of packet loss, the packet loss determining unit 24 of this embodiment performs the above rate calculation (step S4), and determines whether or not to immediately deliver the retransmission request according to a time period (interval of transmission of the redundant packet) required until the next redundant packet arrives (step S5). Since the threshold value is determined according to how long the system allows the delay time, it is possible to suitably set the threshold value from the server 4, for example. For example, approximately 100 [msec] is possible. Additionally, the above system rate and the interval of generation of redundant packets can be set from the server 4. In FIG. 4, the rate calculation is performed each time packet loss occurs. However, it is alternatively possible to perform the calculation once, and fixedly use a result of the calculation for a predetermined period of time thereafter.

When it is found that the time required until the redundant packet arrives is shorter than the threshold value and the redundant packet arrives soon, as a result of the above determination, the packet loss determining unit 24 does not give an instruction to transmit the retransmission request to the retransmission request transmitting unit 23 (No route at step S5). When the time is longer than the threshold value and the delay time will thus increase if arrival of the redundant packet is waited, the packet loss determining unit 24 gives an instruction to transmit the retransmission request to the retransmission request transmitting unit 23 to transmit the retransmission request to the MPEG encoder 1 (Yes route at step S5 to step S6).

The packet loss determining unit 24 of this embodiment has functions as a redundant packet arrival time calculating unit 241 calculating time required until the next redundant packet is received by the packet receiving unit 21 when packet loss is detected, a redundant packet arrival time determining unit 242 determining whether or not a result of the calculation made by the redundant packet arrival time calculating unit 241 is larger than a predetermined threshold value, and an arrival time retransmission request transmission instructing unit 243 giving an instruction to transmit a retransmission request to the retransmission request transmitting unit 23 when the redundant packet arrival time determining unit 242 determines that the result of the calculation is larger than the threshold value (refer to FIGS. 3 and 4).

Thereafter, the MPEG decoder 2 determines whether or not decoding by the MPEG decoding unit 25 is possible (whether or not packets in the packet group as being a unit for decoding are completed) (step S7). When it is found that the decoding is impossible, the MPEG decoder 2 repeats the processes at and after the above step S1 until the decoding becomes possible (No route at step S7). When the decoding is possible, the MPEG decoding unit 25 performs MPEG-decoding (from Yes route at step S7 to step S8).

When the received packet is a redundant packet (when No at step S2), the MPEG decoder 2 first checks whether or not there is any lost packet of N packets having been received (step S9). When no packet loss occurs (when No at step S9), the MPEG decoder 2 discards the redundant packet because error correction is unnecessary. When packet loss occurs, the error correcting unit 22 performs the packet restoring process with the redundant packet (from Yes route at step S9 to step S10).

When packet restoration succeeds (when No at step S11), packets from the restored packet up to the present packet are handed to the MPEG decoding unit 25, and MPEG-decoded therein. When the packet cannot be restored (when Yes at step S11), it is checked whether or not the retransmission request transmitting unit 23 has already transmitted a retransmission request when packet loss is determined (step S12).

When the retransmission request has already been transmitted, the retransmission request is not transmitted at this timing because the packet is expected to be retransmitted from the MPEG encoder 1 (No route at step S12). Conversely, when the retransmission request is not yet transmitted, the retransmission request is transmitted at this timing because the packet is not expected to be retransmitted from the MPEG encoder 1 (from Yes route at step S12 to step S13).

The packet loss determining unit 24 of this embodiment has functions as an error correction determining unit 244 determining whether or not restoration of a lost packet succeeds in the error correcting process by the error correcting unit 22, a retransmission request transmission confirming unit 245 confirming whether or not a retransmission request has been already transmitted to the MPEG encoder 1 when the error correction determining unit 244 determines that restoration of the lost packet fails, and an error correction result retransmission request transmission instructing unit 246 giving an instruction to transmit a retransmission request to the retransmission request transmitting unit 23 when the retransmission request transmission confirming unit 245 confirms that the retransmission request is not yet transmitted (refer to FIGS. 3 and 4).

When data transfer demanded to be real-time is performed in a network 5 such as a high-error-rate IP network or the like in the above process, the MPEG decoder 2 controls the timing of transmission of a retransmission request to the MPEG encoder 1 according to a time interval of transmission of redundant packets, suppresses unnecessary transmission of retransmission requests to suppress the load on the network 5, and regenerates streaming data (video/voice) at the most suitable delay time even when packet loss occurs.

In the above example, the timing of transmission of a retransmission request is controlled according to a time interval of transmission of redundant packets. However, it is alternatively possible to perform the above rate calculation on the basis of a time interval of transmission of MPEG packets, which can provide the same working effect as above example.

[B] Description of Second Embodiment

Figure 5:
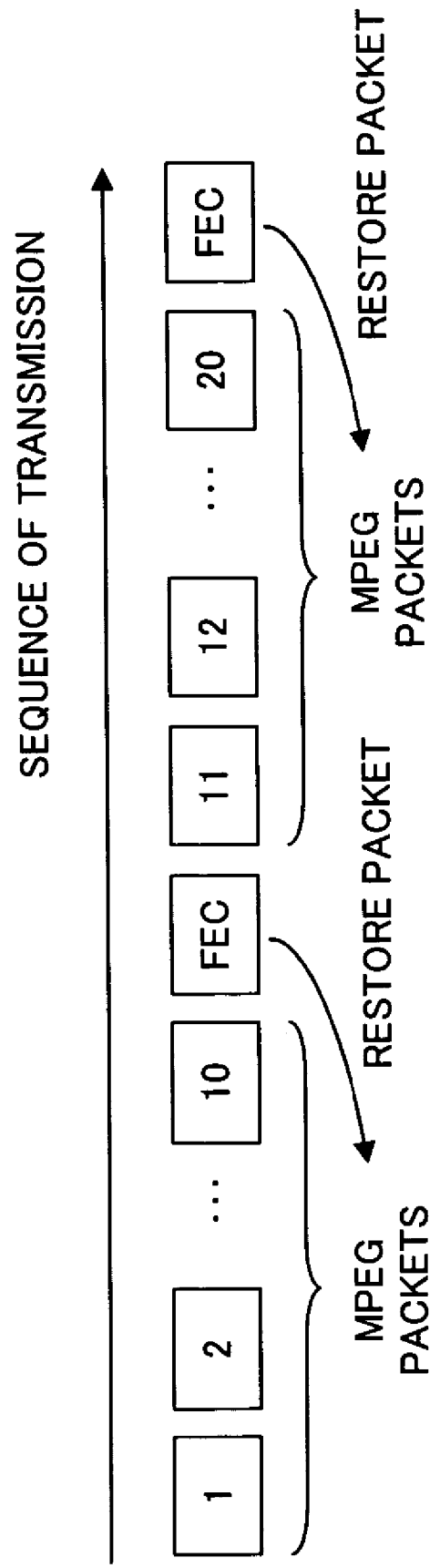
FIG. 5 is a diagram for illustrating an error correcting method according to a second embodiment of this invention.

In the above first embodiment, it is determined, according to a time interval of transmission of redundant packets, whether or not a retransmission request is immediately transmitted. However, there is possibility that the redundant packet is received immediately after even at a low rate, depending on (a number of) the lost packet. As shown in FIG. 5, for example, when one redundant packet (FEC packet) is transmitted for 10 MPEG packets (N=10), a packet having a number 1, 2, 11 or 12 is transmitted in the early stage, while a packet having a number 9, 10, 19 or 20 is transmitted in the later stage in a packet group that can be restored with one redundant packet. Accordingly, a packet having a number 1, 2, 11 or 12 and a packet having a number 9, 10, 19 or 20 largely differ from each other in time required until the redundant packet is received when the packet is lost.

In the MPEG decoder 2 (client 3) according to a second embodiment, the packet loss determining unit 24 determines whether a retransmission request is immediately transmitted at the point of time that occurrence of packet loss is recognized or the retransmission request is transmitted after receiving a relevant redundant packet, by calculating the time required until the next redundant packet arrives on the basis of a packet number of a packet that is lost. Incidentally, other parts of the structure are the same or similar to those in the first embodiment described above. Parts designated by like reference characters are the same or similar to those described above unless otherwise specifically mentioned.

For example, under conditions that the system rate is 100 kbps, the packet length is 512 bytes, and the redundant packet generation interval is one per ten packets, when a packet having a packet number 1 or 11 shown in FIG. 5 is lost, (512[bytes]*8[bits/byte]/100,000[bits/sec])*10= 409.6[msec].

Accordingly, the redundant packet does not arrive until 409.6 msec has been elapsed.

On the other hand, under the same conditions (the system rate=100 kbps, the packet length=512 byte, the redundant packet generation interval=one per ten packets), when a packet having a packet number 10 or 20 shown in FIG. 5 is lost, (512[bytes]*8[bits/byte]/100,000[bits/sec])*1= 40.96[msec].

Accordingly, the redundant packet arrives after 40.96 msec.

The packet loss determining unit 24 according to this embodiment determines time required until the redundant packet arrives on the basis of a packet number of the lost packet, and determines whether or not a retransmission request is immediately transmitted from the retransmission request transmitting unit 23 according to the time of its arrival. Doing so can more improve the accuracy of determination on whether the transmit request is necessary or unnecessary than the first embodiment. Incidentally, since the threshold value that is a reference of the determination is determined according to how long the system allows the delay time like the first embodiment, the threshold value can be set from the server 4 in the second embodiment, as well. For example, approximately 100 [msec] is possible in this case, as well.

The packet loss determining unit 24 determines that it will take a long time until the next redundant packet arrives when the time of arrival of the next redundant packet is larger than the threshold value, and gives an instruction to transmit a retransmission request to the retransmission request transmitting unit 23. When smaller, the packet loss determining unit 24 does not give the instruction to transmit the retransmission request to the retransmission request transmitting unit 23 in order to wait arrival of the redundant packet. Incidentally, other operations are according to the operations described above with reference to the flowchart shown in FIG. 4.

Owing to the above process, the second embodiment can provide the similar effects and advantages to those provided by the first embodiment. Additionally, the second embodiment can optimize the delay time in regeneration of streaming data (video/voice) required to be real-time while suppressing occurrence of unnecessary retransmission requests more effectively than the first embodiment because accuracy of the determination on whether the retransmission request is necessary or unnecessary is improved.

[C] Description of Third Embodiment

According to a third embodiment, when a part of MPEG packets delivered from the MPEG encoder 1 is lost, the MPEG decoder 2 (or client 3) changes the timing of transmission of a retransmission request to the MPEG encoder 1 according to a degree (the number of lost packets) of the loss of packets. Incidentally, the structures of the MPEG encoder 1 and the MPEG decoder 2 (client 3) are the same as or similar to those described above with reference to FIGS. 2 and 3 unless otherwise specifically mentioned. The operation of the MPEG decoder 1 is the same as or similar to that according to the first embodiment unless otherwise specifically mentioned.

Figure 6:
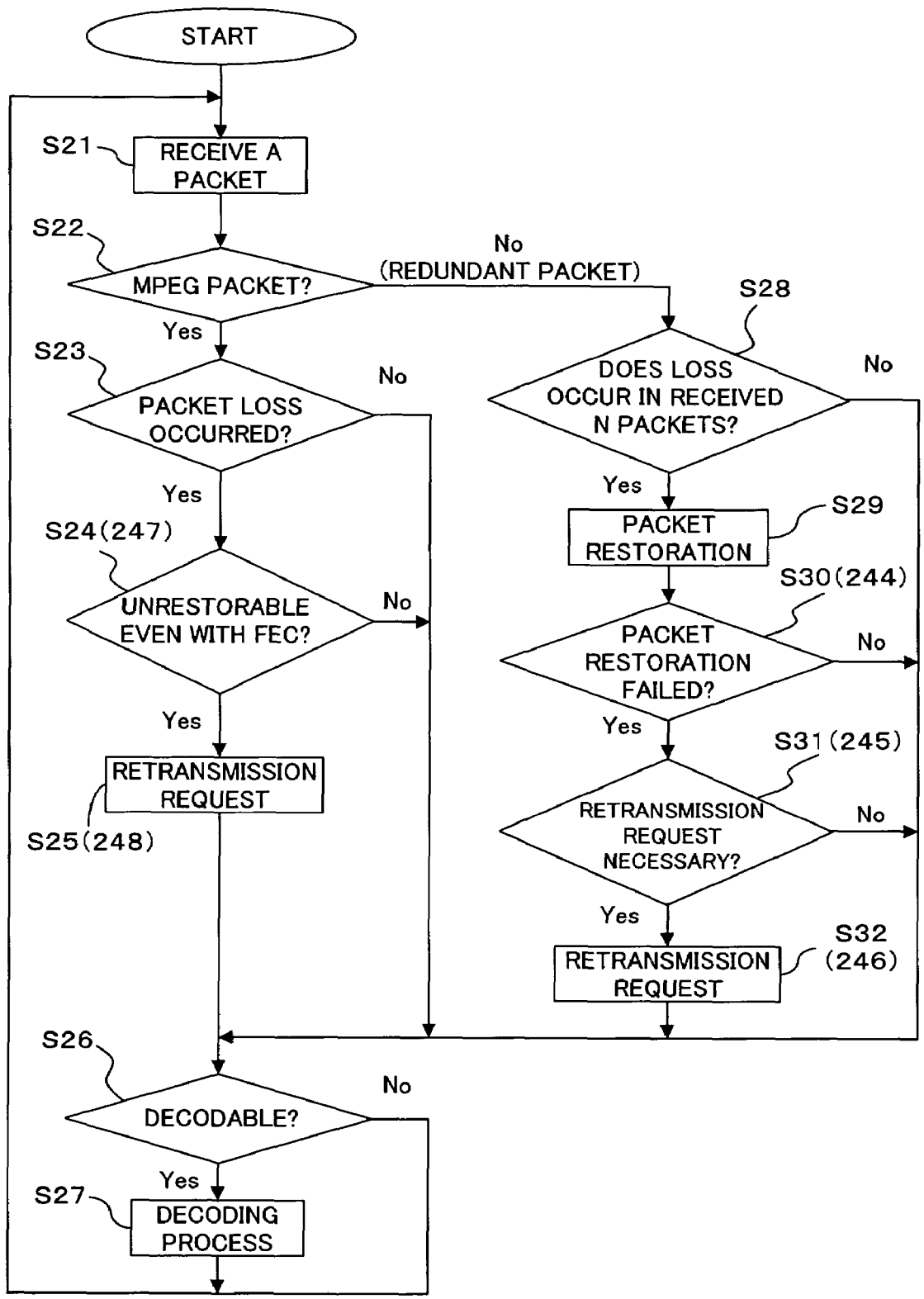
FIG. 6 is a flowchart for illustrating an error correcting method according to a third embodiment of this invention.
Figure 7:
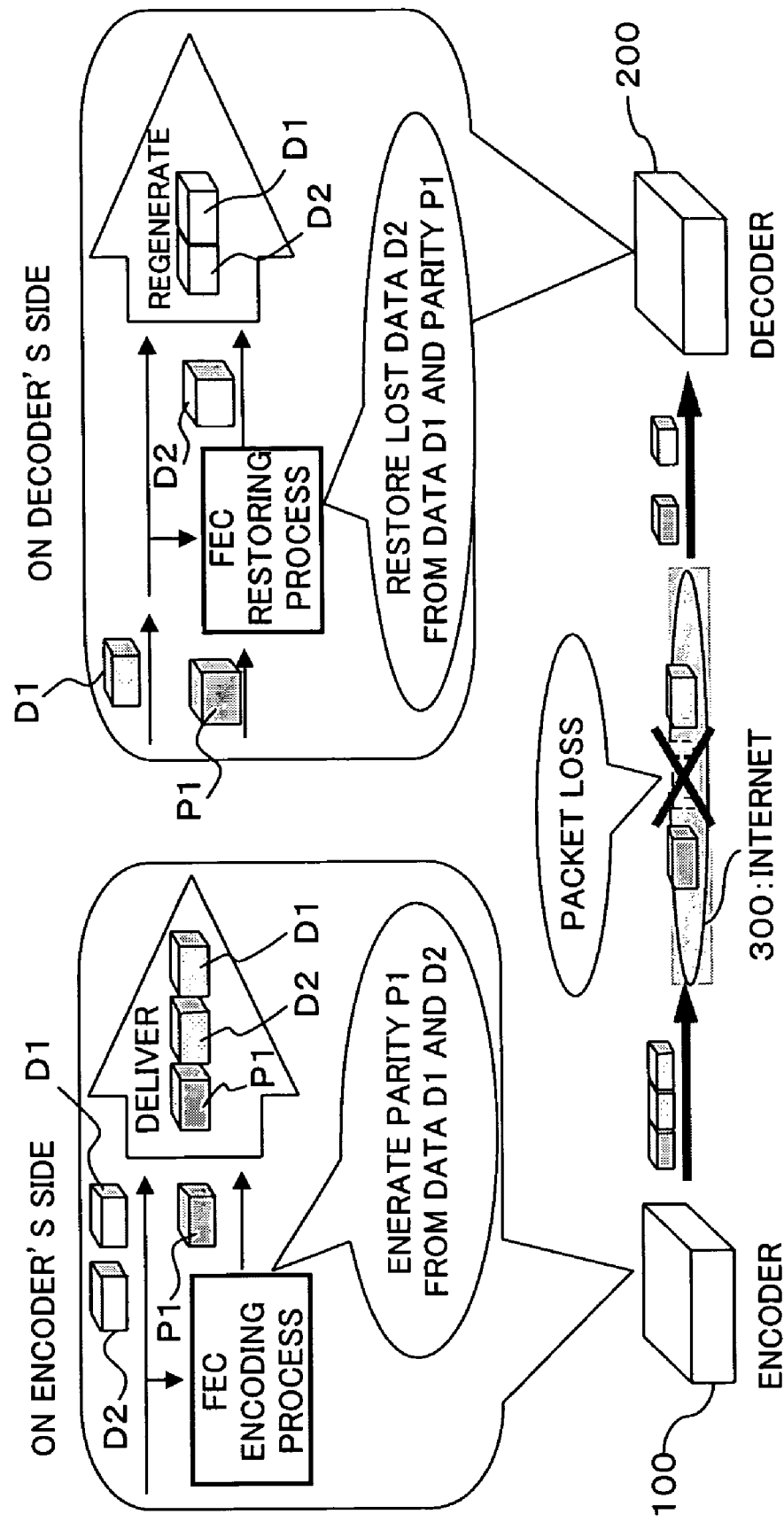
FIG. 7 is a diagram for illustrating a known error correcting method using FEC.
Figure 8:
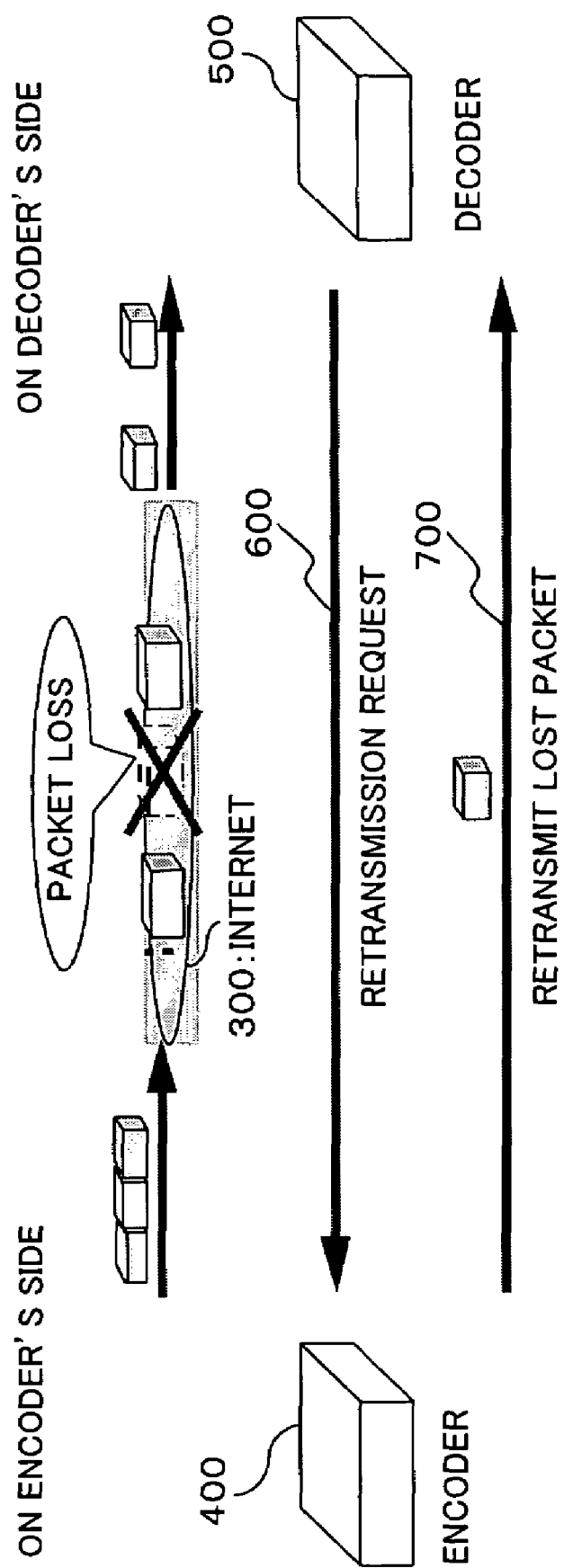
FIG. 8 is a diagram for illustrating a known error correcting method using ARQ.

The MPEG decoder 2 according to the third embodiment operates according to a flowchart (step S21 to S32) shown in, for example, FIG. 6. In this case, the MPEG decoder 2 receives a packet delivered over the network 5 by the packet receiving unit 21 (step S21), and determines whether the received packet is an MPEG packet or a redundant packet (step S22). When the received packet is an MPEG packet (when Yes at step S22), the MPEG decoder 2 determines whether or not the received packed is next to a packet received last time from its sequence number of RTP, for example, to determine whether or not packet loss occurs (step S23).

When it is found that no packet loss occurs as a result, the received packet (MPEG packet) is outputted to the MPEG decoding unit 25 as it is (No route at step S23). When packet loss occurs, the packet loss determining unit 24 determines the degree of loss of packets (the number of packets) from the sequence numbers of RTP to determine whether or not restoration by the error correcting unit 22 (FEC) is possible (from Yes route at step S23 to step S24).

For example, when the sequence number of the packet received immediately before is M (M being a natural number), numbers not larger than M are packets having been already received, thus the number of normal packets is M+1. When one packet is lost, the number of normal packets is M+2. Numbers not smaller than M+3 signifies that a plurality of packets are lost. When one redundant packet is added to N MPEG packets and transmitted from the MPEG encoder 1, one error in N packets can be restored by FEC, but it is impossible to restore (recover) two or more packets.

For this, when loss of a plurality of packets occurs, the packet loss determining unit 24 can determine that the packets cannot be restored at that point of time, thus makes the transmit request transmitting unit 23 immediately transmit a retransmission request to the MPEG encoder 1 (from Yes route at step S24 to step S25). Incidentally, there is possibility that a desired packet can be received normally thereafter because the sequence of packets to be received is exchanged at random or anything, but this possibility is probabilistically low.

When the number of lost packets is not larger than one in a packet group consisting of N packets, the packet loss determining unit 24 does not give an instruction to transmit a retransmission request to the retransmission request transmitting unit 23 at this point of time, but stands by to transmit the retransmission request until the next redundant packet is received (No route at step S24). Incidentally, processes at other steps S26 to S32 shown in FIG. 6 are similar to the processes at step S7 to S13 described above with reference to FIG. 4.

The packet loss determining unit 24 according to this embodiment has functions as a lost packet number determining unit 247 determining whether or not the number of lost packets is not smaller than a predetermined number (two), and a lost packet number retransmission request transmission instructing unit 248 giving an instruction to transmit a retransmission request to the retransmission request transmitting unit 23 when the lost packet number determining unit 247 determines that the number of lost packets is not smaller than the predetermined number (refer to FIGS. 3 and 6).

As above, when packet loss occurs, the MPEG decoder 2 controls (changes) the timing of transmission of a retransmission request according to its degree, thereby providing similar effects and advantages to those provided by the first embodiment. In this case, it becomes possible to determine in the early stage whether the retransmission request is necessary or unnecessary, so that regeneration of streaming data (video/voice) becomes possible with the most suitable delay time.

According to the embodiments of this invention described above, when packet(s) transmitted from the MPEG encoder 1 is lost, the MPEG decoder controls (changes) the timing of transmission of a retransmission request to the MPEG encoder 1 according to whether or not the lost packet(s) can be restored (in concrete, according to the interval of transmission of redundant packets for error correction, the time of arrival of the redundant packet, or the degree of packet loss) by the FEC (error correcting unit 22) within a predetermined time period. It is thus possible to suppress transmission of an unnecessary retransmission request and transmission of a retransmitted packet in response thereto, thereby to regenerate streaming data of video/voice and the like required to be real-time with the most suitable delay time while suppressing the load on the network.

The present invention is not limited to the above examples, but may be modified in various ways without departing from the scope of the invention, as a matter of course.

For example, whenever packet loss occurs, determination on whether a retransmission request is necessary or unnecessary is always made in the above embodiments. However, it is alternatively possible to omit the determination, and transmit a retransmission request only when error correction by FEC fails.

In the above embodiments, streaming data to be transferred is data encoded according to MPEG (MPEG packets). However, this invention can be applied to data encoded in other encoding system in the similar manner, as a matter of course.

Further, in the above embodiments, this invention is applied to the MPEG decoder 2 or the client 3. However, this invention can be applied to any apparatus so long as it can receive packets in the similar manner, and can provide similar effects and advantages to those provided by the above embodiments.

As described above in detail, this invention can suppress transmission of an unnecessary retransmission request and a retransmitted packet in response thereto, and perform regeneration of streaming data of video/voice required to be real-time with the most suitable delay time while suppressing the load on the network. Accordingly, this invention is very useful as an error correction technique in the Internet communications field required to be real-time, in particular.

What is claimed is:

1. A packet error correcting apparatus comprising:
    a packet receiving unit for receiving a plurality of packets and a number of redundant packets for error correction over a network from a packet transmitting apparatus transmitting packets and redundant packets at the rate of one redundant packet per N packets, where N is a natural number;
    a packet loss detecting unit for detecting loss of a packet among the plurality of packets received by said packet receiving unit;
    an error correcting unit for performing an error correcting process to restore the lost packet on the basis of a next redundant packet among said redundant packets to be received next by said packet receiving unit when said packet loss detecting unit detects loss of said packet;
    a retransmission request transmitting unit being able to transmit a retransmission request for said lost packet to said packet transmitting apparatus; and
    a retransmission request controlling unit for determining whether or not said lost packet can be restored by said error correcting unit within a predetermined time period based on a timing of reception of one of said redundant packets received by said packet receiving unit, and controlling said error correcting unit to perform said error correcting process after the reception of the next redundant packet upon determination that said lost reception packet can be restored within the predetermined time period while controlling said retransmission request transmitting unit to transmit the retransmission request to said packet transmitting apparatus upon determination that said lost reception packet cannot be restored within the predetermined time period.

2. The packet error correcting apparatus according to claim 1, wherein said retransmission request controlling unit comprises:
    a redundant packet arrival time calculating unit for calculating time required until the next redundant packet is received by said packet receiving unit when said packet loss detecting unit detects loss of said packet;
    a redundant packet arrival time determining unit for determining whether or not a result of calculation by said redundant packet arrival time calculating unit is larger than a predetermined threshold value; and
    an arrival time retransmission request transmission instructing unit for giving an instruction for transmitting said retransmission request to said retransmission request transmitting unit when said redundant packet arrival time determining unit determines that said result of calculation is larger than said threshold value.

3. The packet error correcting apparatus according to claim 1, wherein said retransmission request controlling unit comprises:
    a lost packet number determining unit for determining whether or not the number of lost packets detected by said packet loss detecting unit is equal to or larger than a predetermined number; and a lost packet number retransmission request transmission instructing unit for giving an instruction for transmitting said retransmission request to said retransmission request transmitting unit when said lost packet number determining unit determines that the number of lost packets is equal to or larger than said predetermined number.

4. The packet error correcting apparatus according to claim 1, wherein said retransmission request controlling unit comprises:

an error correction determining unit for determining whether or not restoration of said lost packet succeeds in said error correcting process by said error correcting unit;

a retransmission request transmission confirming unit for confirming whether or not said retransmission request has been already transmitted to said packet transmitting apparatus when said error correction determining unit determines that the restoration of said lost packet fails; and an error correction result retransmission request transmission instructing unit for giving an instruction for transmitting said retransmission request to said retransmission request transmitting unit when said retransmission request transmission confirming unit confirms that said retransmission request is not yet transmitted.

5. The packet error correcting apparatus according to claim 2, wherein said retransmission request controlling unit comprises:

an error correction determining unit for determining whether or not restoration of said lost packet succeeds in said error correcting process by said error correcting unit;

a retransmission request transmission confirming unit for confirming whether or not said retransmission request has been already transmitted to said packet transmitting apparatus when said error correction determining unit determines that the restoration of said lost packet fails; and an error correction result retransmission request transmission instructing unit for giving an instruction for transmitting said retransmission request to said retransmission request transmitting unit when said retransmission request transmission confirming unit confirms that said retransmission request is not yet transmitted.

6. The packet error correcting apparatus according to claim 3, wherein said retransmission request controlling unit comprises:

an error correction determining unit for determining whether or not restoration of said lost packet succeeds in said error correcting process by said error correcting unit;

a retransmission request transmission confirming unit for confirming whether or not said retransmission request has been already transmitted to said packet transmitting apparatus when said error correction determining unit determines that the restoration of said lost packet fails; and an error correction result retransmission request transmission instructing unit for giving an instruction for transmitting said retransmission request to said retransmission request transmitting unit when said retransmission request transmission confirming unit confirms that said retransmission request is not yet transmitted.

7. A packet error correcting method comprising the steps of:

receiving a plurality of packets and a number of redundant packets for error correction over a network from a packet transmitting apparatus transmitting packets and redundant packets at the rate of one redundant packet per N packets, where N is a natural number;

detecting loss of a reception packet among the plurality of packets;

when loss of said reception packet is detected, determining whether or not said lost reception packet can be restored within a predetermined time period in an error correcting process for restoring said lost reception packet on the basis of a next redundant packet among said redundant packets to be received next based on a timing of reception of one of said redundant packets;

upon determination that said lost reception packet can be restored within the predetermined time period, performing said error correcting process after the reception of the next redundant packet; and upon determination that said lost reception packet cannot be restored within the predetermined time period, transmitting the retransmission request to said packet transmitting apparatus.

8. The packet error correcting method according to claim 7, wherein when loss of said reception packet is detected, time required until the next redundant packet is received is calculated, it is determined whether or not a result of the calculation is larger than a predetermined threshold value, and said retransmission request is transmitted when it is determined that said result of the calculation is larger than said threshold value.

9. The packet error correcting method according to claim 7, wherein it is determined whether or not the number of lost packets is equal to or larger than a predetermined number, and said retransmission request is transmitted when said number of lost packets is equal to or larger than said predetermined number.

10. The packet error correcting method according to claim 7, wherein it is determined whether or not restoration of said lost packet succeeds in said error correcting process, it is determined whether or not said retransmission request has been already transmitted to said packet transmitting apparatus when it is determined that the restoration of said lost packet fails, and said retransmission request is transmitted when said retransmission request is not yet transmitted.

11. The packet error correcting method according to claim 8, wherein it is determined whether or not restoration of said lost reception packet succeeds in said error correcting process, it is determined whether or not said retransmission request has been already transmitted to said packet transmitting apparatus when it is determined that the restoration of said lost reception packet fails, and said retransmission request is transmitted when said retransmission request is not yet transmitted.

12. The packet error correcting method according to claim 9, wherein it is determined whether or not restoration of said lost reception packet succeeds in said error correcting process, it is determined whether or not said retransmission request has been already transmitted to said packet transmitting apparatus when it is determined that the restoration of said lost reception packet fails, and said retransmission request is transmitted when said retransmission request is not yet transmitted.

* * * * *